Aug. 18, 1953  M. J. ANDERSON  2,649,177
UNIVERSAL COUPLING FOR CONVEYERS
Filed March 12, 1951  2 Sheets-Sheet 1

INVENTOR.
MARTIN J. ANDERSON
BY
ATTORNEY

Aug. 18, 1953   M. J. ANDERSON   2,649,177
UNIVERSAL COUPLING FOR CONVEYERS
Filed March 12, 1951   2 Sheets-Sheet 2

INVENTOR.
MARTIN J. ANDERSON
BY
ATTORNEY

Patented Aug. 18, 1953

2,649,177

UNITED STATES PATENT OFFICE 2,649,177

UNIVERSAL COUPLING FOR CONVEYERS

Martin J. Anderson, Ellwood City, Pa., assignor to Mathews Conveyer Company, Ellwood City, Pa., a corporation of Pennsylvania Application March 12, 1951, Serial No. 215,123

12 Claims. (Cl. 193—35)

1

This invention relates to universal couplings for connecting together the ends of conveyor sections, particularly gravity conveyor sections of the wheel or roller type.

To provide flexibility and portability, gravity conveyers are usually made in sections of convenient length. It is the present practice to provide coupling devices on the ends of such conveyer sections for securing together the ends of the sections and thereby form a conveyer system of a desired length. Particularly on gravity conveyers of the wheel or roller type, it has been the practice to use a universal coupling such as that shown in Reissue Patent No. 14,763 of December 2, 1919, granted upon an application of Winthrop C. Kellogg, and assigned to the same assignee as the present application. Some manufacturers have used a non-universal coupling in which two hooks are secured to the side rails at one end of a conveyer section and a transverse rod is secured to the side rails at the opposite end of the section. The fixed hooks slip over the fixed rod of an adjoining section thereby coupling together the ends of the two sections. While this arrangement provides a satisfactory coupling, the coupling is not universal as a section must sometimes be turned end for end so the hook end of one section is contiguous to the rod end of an adjoining section.

A major object of the present invention is to provide an improved universal coupling for conveyer sections, which coupling is of simplified construction and is more economical to manufacture. Another object of the invention is to provide a universal coupling which may be converted to a non-universal coupling so the conveyer section may easily be connected to an existing conveyer section having a coupling of the non-universal type described above.

In the attainment of these objects, one important feature of the invention resides in the arrangement of a coupling member pivoted to one side rail near one end of the conveyer with upwardly and downwardly extending hooks beyond the end of the conveyer section for engaging a stud projecting laterally from a corresponding side rail of an adjoining section. A similar coupling member may be provided on the other side rail at the opposite end of the section. Another feature of the invention resides in the provision of cooperating abutments on the coupling members and the side rails limiting pivotal movement of the coupling members relative to the respective side rails so the coupling members are at all times retained in position for coupling onto an adjoining conveyer section.

2

Other objects and advantages of the invention will become apparent from the following specification taken in connection with the accompanying drawings wherein Figure 1 is a top plan view showing parts of two conveyer sections having their ends coupled together in accordance with a preferred form of the invention;

Figure 1:
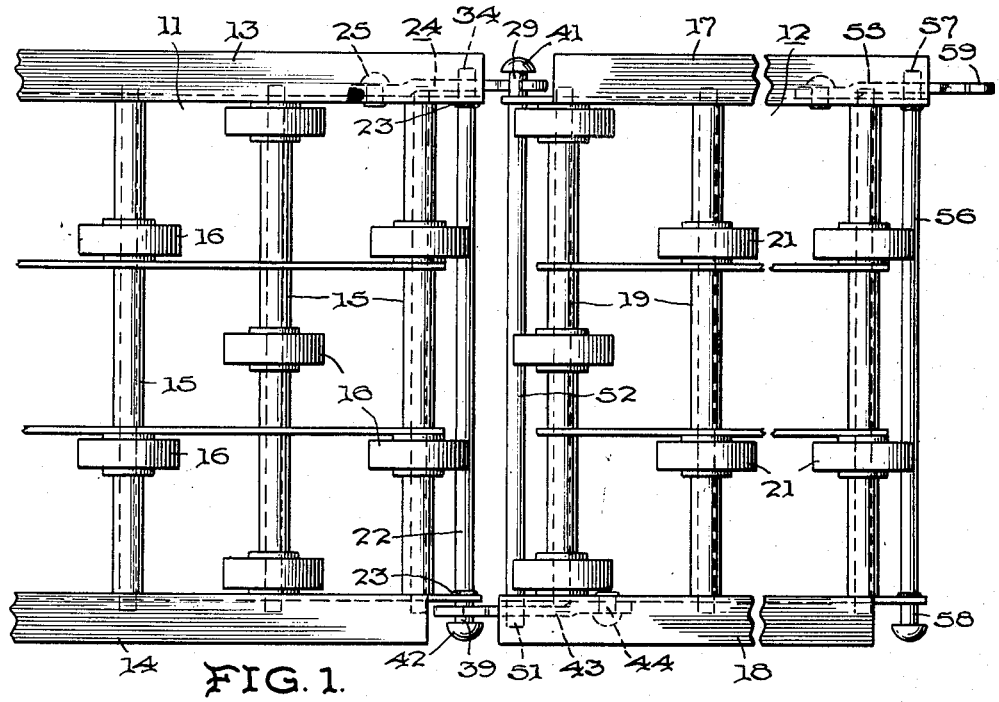

Referring now to the illustrations of the invention shown in the accompanying drawings, Fig. 1 shows a conveyer section 11 having one end coupled to the end of an adjoining conveyer section 12. Conveyer section 11 has spaced side rails 13 and 14 shown in this case as channels extending longitudinally along the sides of the section. Extending transversely between these side rails are a series of longitudinally spaced rods 15, 15, each of which carries two or more rotatable wheels 16, 16. Conveyer section 12 is of the same construction with side rails 17 and 18 carrying rods 19, 19, for rotatable wheels 21, 21.

Serving as a transverse brace for conveyer section 11 is a transverse rod 22 extending between the ends of side rails 13 and 14 and preferably secured to the side rails as by welding indicated at 23. Rod 22 preferably extends beyond the sides of both side rails 13 and 14 for purposes to be hereinafter described.

Figure 4:
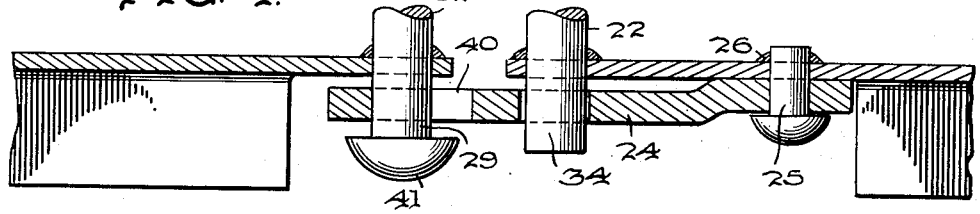
Fig. 4 is a horizontal sectional view taken on the line 4—4 of Fig. 3.

Coupling member 24 may be pivotally mounted on the outer face of side rail 11 as by a rivet 25 extending through a hole in the coupling member and secured to the side rail by welding, as indicated at 26 (Fig. 4). Preferably, coupling member 24 has a flat surface engaging the outer face of side rail 13 in the area surrounding pivot 25. Extending from the pivot 25 toward and beyond the end of the side rail 13, coupling 24 is offset outwardly from the outer face of the side rail 13. Beyond the end of said rail 13, coupling 24 has at its free end an upwardly extending hook 27 and a downwardly extending hook 28. These hooks are for the purpose of engaging a coupling stud 29 projecting laterally from the outer face of corresponding side rail 17 of the adjoining conveyer section 12. Preferably, the hooks are of a locking type having openings 31, 31, corresponding in width to the diameter of stud 29 with enlarged apertures 32, 32, toward the center of the coupling providing inner shoulders 33, 33, on on the hooks 27 and 28 for engaging and retaining the stud 29.

For the purpose of limiting pivotal movement of coupling member 24 relative to side rail 13, rod 22 projects beyond the base of side rail 13 to provide an abutment stud 34 projecting through a vertically elongated arcuate slot 35 formed in the coupling member 24 between its pivot 25 and the hooks 27 and 28. Upper and lower ends 36 and 37 of the slot 35 provide abutments cooperating with the abutment stud 34 so pivotal movement of the coupling member 24 is limited to the length of the slot 35.

To provide longitudinal alinement of the coupled conveyer section, the length of slot 35 is such that top abutment 36 engages abutment stud 34 when the sections are properly alined and coupling stud 29 engages base 40 of hook 27. When the coupling member 24 has base 40' of its lower hook 28 engaging coupling stud 29, the sections are longitudinally alined as lower abutment 37 engages abutment stud 34. Thus, the length of slot 35 is related to the spacing between base 40 of hook 27 and base 40' of hook 28, and is related to the diameter of the abutment stud 34 and the coupling stud 29, in such a manner that coupled conveyer sections are longitudinally alined by engagment of the cooperating abutments on the coupling member and the side rail.

As the slot 35 is formed centrally in the coupling member 24, and is disposed between the pivot for the coupling member and the hooks on the coupling member, the cooperating abutments retain the coupling member 24 in position so its hooks 27 and 28 at all times project beyond the end of rail 13. Thus, the hooks on the coupling member are continuously positioned for convenient connection to a coupling stud, such as stud 29, on corresponding side rail 17 of adjoining conveyer section 12.

Figure 2:
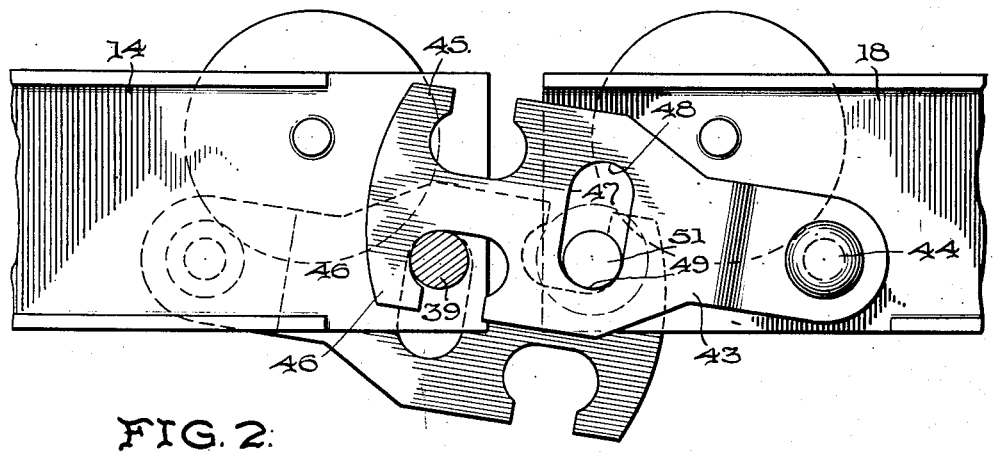
Fig. 2 is an enlarged side elevational view showing the ends of the conveyer sections as seen from the bottom of Fig. 1, some parts being shown in section for purposes of clearness.
Figure 3:
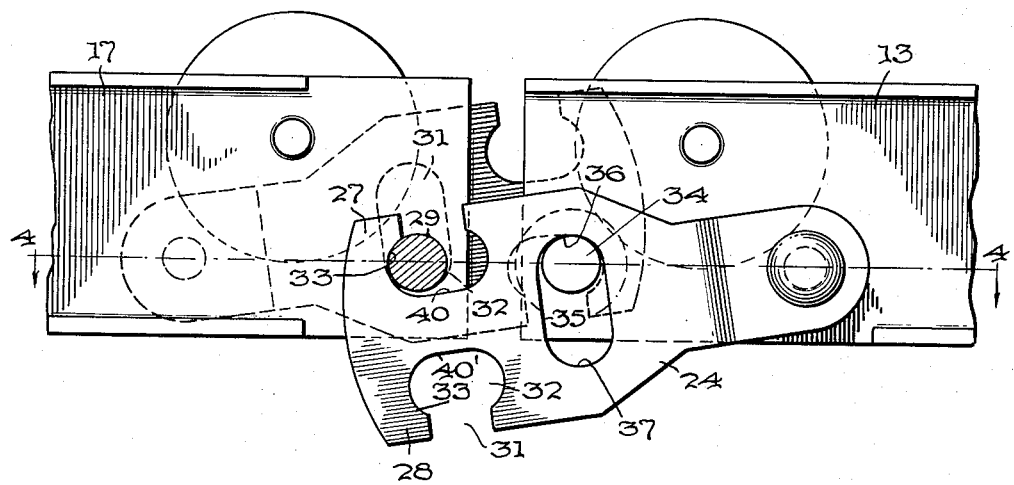
Fig. 3 is a similar elevational view of the side at the top of Fig. 1.

Rod 22 extends outwardly from the base of side rail 14 to form a coupling stud 39 corresponding to the coupling stud 29. Both coupling studs are fixed to their respective side rails and have heads 41 and 42, respectively, spaced outwardly from the bases of side rails 17 and 14 so hooks engage the studs between their heads and the side rails. Thus, rod 22 extends transversely between the side rails 13 and 14 with one end projecting beyond side rail 13 to form abutment stud 34 and its other end projecting beyond said rail 14 to form coupling stud 39 for engagement with a corresponding coupling member 43 mounted by pivot 44 to the outer face of side rail 18 on the adjoining section 12. Coupling member 43 (Fig. 2) is identical with coupling member 24, having upwardly and downwardly extending hooks 45 and 46 for engaging coupling stud 39 and vertically elongated slot 47, with abutments 48 and 49 at its ends, cooperating with abutment stud 51 to limit pivotal movement of the coupling member 43 relative to side rail 18. Transverse rod 52 extends between side rails 17 and 18 and has one end projecting beyond side rail 17 to form coupling stud 29 and its other end projecting beyond side rail 18 to form abutment stud 31. As the rod 52 is welded to the side rails 17 and 18 the rod serves as a transverse brace for the conveyer section 12.

With the coupling members for the sections 11 and 12 as described, the sections may be coupled together by dropping either section onto the coupling members for the other section. As illustrated in Fig. 1, section 12 has been dropped into position at the end of section 11. With section 11 in place, its coupling member 24 was in its lower position with abutment stud 39 engaging upper end 36 of the slot 35. When section 12 was dropped into position, its coupling stud 29 engaged upper hook 27 on the coupling member 24. At the same time, lower hook 46 on coupling member 43 engaged coupling stud 39 on conveyer section 11. As the conveyer section 12 was lowered into place, coupling member 43 was raised by stud 39 until abutment stud 51 engaged abutment 49 at the lower end of the slot 47. As finally positioned, side rail 17 of the section 12 is supported by coupling stud 29, coupling member 24, abutment stud 34, and side rail 13. Similarly, side rail 18 is supported by abutment stud 51, coupling member 43, and coupling stud 39 on side rail 14.

Thus, it will be seen that, either conveyer section may be first installed and the next conveyer section dropped into place. To provide universal coupling of either end of a conveyer section 12 with either end of any other section, section 12 has one side rail 18 with a coupling member 43 pivoted at one end and another side rail 17 with a coupling member 55 pivoted at its opposite end, the hook of the first coupling member 43 projecting beyond the one end of the one side rail 18 and the hook of the other coupling member 55 projecting beyond the opposite end of the other side rail 17. Also, the other end of section 12 has rod 56 extending between its side rails with one end of the rod providing an abutment stud 57 engaging abutments on the coupling member 55 and the other end of the rod forming a coupling stud 58 for engaging the hook of a coupling member pivoted to a corresponding side rail of an adjoining section. Coupling member 55 has, beyond the other end of the section, an upwardly extending hook 59 and a downwardly extending hook similar to the hook on coupling members 24 and 43. With this arrangement, either end of the section 17 may be coupled to either end of any other section having the same universal coupling. When all sections of a conveyer are provided with similar couplings, either end of a section may readily be coupled with either end of any other section.

The construction of this universal coupling is very simple in that the abutment and coupling studs are extensions of a transverse rod brace and the coupling members are secured by rivets in holes formed in the side rails of the sections. Except for drilling pivot holes, it is unnecessary to chamfer or machine the conveyer sections to accommodate universal couplings made according to this invention. All that need be done is to cut away the flanges of one side rail to expose the coupling stud such as coupling stud 29. With a coupling member secured by a rivet on the side rail, the coupling is completed. As described, the hooks are so designed that they lock the coupling studs against interior shoulders. This provides a secure coupling with ample tolerance for longitudinal and lateral movement. As the transverse rods serve as transverse braces, the only additional cost of the couplings is the cost of the coupling members themselves and the cost of the assembly step involving the riveting of these members onto the sides of the conveyer.

The rods, being transverse braces, provide rugged frame members on both sections, both coupling members directly engaging these frame members. Thus, forces on the sections in a longitudinal direction are transmitted directly from transverse rod 22 through the coupling members to transverse rod 52. In this way, longitudinal stress is not transmitted to the pivots 25 and 44 for the coupling members.

Figure 5:
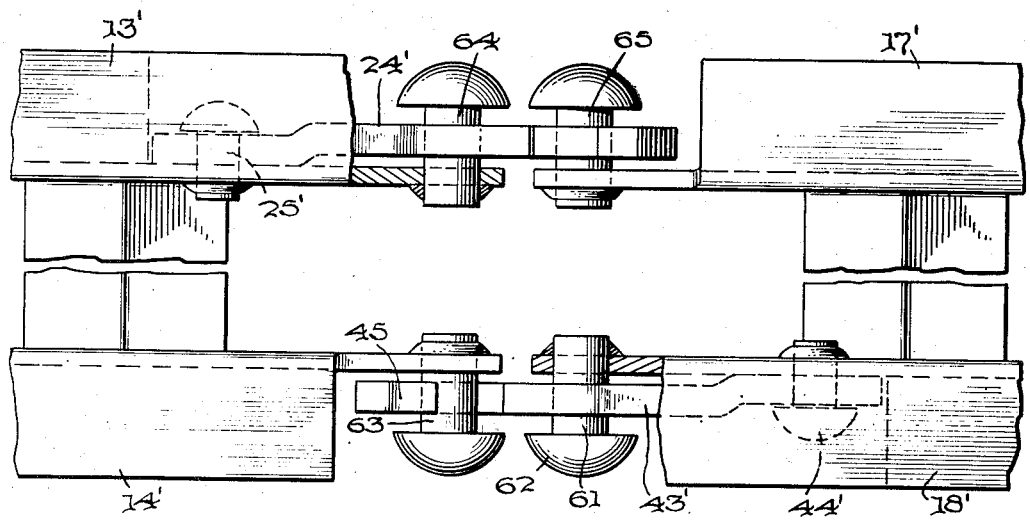
Fig. 5 is a top plan view, on an enlarged scale, of parts of a conveyor section in which is incorporated a modified form of coupling, some parts being broken away and others shown in section for purposes of clearness.

In addition to providing a simplified universal coupling which may be economically manufactured, the invention also contemplates a coupling which may easily be converted to one for connection to a non-universal coupling of the type described in the first part of this specification. To convert conveyer section 17, it is only necessary to remove one coupling and secure it to the other end of the conveyer section. For example, coupling 43 might easily be removed from pivot 44 and secured by a similar pivot to the other end of the conveyer where coupling stud 58 would then serve as an abutment stud extending through slot 47 in the coupling member 43. As thus modified, conveyer section 12 could have its rod 52 engaged by the fixed hooks on the side rails of an existing conveyer section and the hooks on coupling members 55 and 43 could engage the fixed studs on another conveyer section having non-universal couplings.

Where a transverse brace, such as the rods 22 and 52, is unnecessary, the coupling may be further simplified as illustrated in Fig. 5. In this case, side rail 18' has a coupling member 43' pivoted by a rivet 44', to the side rail 18' in the same manner that coupling 43 is attached to side rail 18. Instead of transverse rod 52, an abutment stud 61 is secured to side rail 18' and projects outwardly from the face of the base of the side rail. This stud 61 may have a head 62. The stud 61 engages an elongated slot corresponding to the slot 47 in the coupling member 43 to limit pivotal movement of the coupling member 43' relative to the side rail. Coupling member 43' has an upwardly extending hook 45' corresponding to the upwardly extending hook 45 on coupling member 43 and a downwardly extending hook corresponding to the downwardly extending hook 46. Instead of transverse rod 22, side rail 14' has secured thereto a coupling stud 63, corresponding to coupling stud 39, for engaging the hooks on the coupling member 43'. The other side rail 13' has a coupling member 24' pivoted by rivet 25' with an abutment stud 64 extending outwardly from the outer face of the side rail 13' and transversely alined with the coupling stud 63. Hooks on the coupling member 24' engage a coupling stud 65 extending outwardly from the outer face of side rail 17' and transversely alined with abutment stud 61.

The modified form of the invention shown in Fig. 5 operates in the same way as the preferred form shown in the remaining figures. Longitudinal forces are transmitted by the coupling members between a coupling stud on one section and an abutment stud on a corresponding section. Either section may be dropped into place and coupled to either end of another section.

As is the case in the preferred form of the invention, the modified form does not require any change in the shape of the side rails. It is of simple construction and may be economically assembled onto new conveyer sections or onto existing conveyor sections. This modified form may also be converted so it will connect with non-universal couplings. The only change involves the transfer of one coupling member to the other end of the conveyer section.

What is claimed is:

1. In a conveyer section having spaced side rails, a universal section coupling comprising a member pivoted to one side of one rail, and upwardly and downwardly extending hooks on said member beyond the end of said one rail for respectively engaging beneath or above a coupling stud on a corresponding side rail of an adjoining section.

2. In a conveyer section having spaced side rails, a universal section coupling comprising a member pivoted to one side of one rail, upwardly and downwardly extending hooks on said member beyond the end of said one rail for engaging a coupling stud on a corresponding side rail of an adjoining section, and cooperating abutments on said one side rail and said member limiting pivotal movement of said member relative to said one side rail to maintain alignment of adjoining sections.

3. In a conveyer section having spaced side rails, a universal section coupling comprising a first coupling member pivoted to one rail near one end thereof, and a second coupling member pivoted to the other rail near the opposite end thereof, upwardly and downwardly extending hooks on both of said members extending beyond the respective ends of said rails for respectively engaging beneath or above coupling studs on corresponding side rails of adjoining sections.

4. In a conveyer section having spaced side rails, a universal section coupling comprising a first coupling member pivoted to one rail near one end thereof, upwardly and downwardly extending hooks on said first member beyond the end of said one rail for engaging a coupling stud on a corresponding side rail of an adjoining section, cooperating abutments on said one side rail and said first member limiting pivotal movement of said first member relative to said one rail, a second coupling member pivoted to the other rail near the opposite end thereof, upwardly and downwardly extending hooks on said second member beyond the end of said other rail for engaging a coupling stud on a corresponding side rail of another adjoining section, and cooperating abutments on said other side rail and said second member limiting pivotal movement of said second member relative to said other rail.

5. In a conveyer section having spaced side rails, a universal section coupling comprising a member pivoted to one side of one rail near one end thereof, upwardly and downwardly extending hooks on said member beyond the end of said one rail for respectively engaging beneath or above a coupling stud on a corresponding side rail of an adjoining section, and a coupling stud on said one side of said one rail near the opposite end thereof for engaging the hook on a coupling member pivoted to a corresponding rail on another adjoining section.

6. In a conveyer section having spaced side rails, a universal section coupling comprising a first coupling member pivoted to one rail near one end thereof and a second coupling member pivoted to the other rail near the opposite end thereof, upwardly and downwardly extending hooks on both of said members beyond the respective ends of said rails for engaging coupling studs on corresponding rails of adjoining sections, and coupling studs on said one rail near said opposite end and on said other rail near said one end for engaging hooks on coupling members pivoted on corresponding side rails of adjoining sections.

7. In a conveyer section having spaced side rails, a universal section coupling comprising a first coupling member pivoted to one rail near one end thereof and a second coupling member pivoted to the other rail near the opposite end thereof, upwardly and downwardly extending hooks on both coupling members beyond the ends of the respective rails for engaging coupling studs on corresponding side rails of adjoining sections, coupling studs on said one rail near said opposite end and on said other rail near said one end for engaging hooks on coupling members pivoted on corresponding side rails of adjoining sections, and cooperating abutments on both coupling members and both side rails limiting pivotal movement of said members relative to the respective side rails.

8. In a conveyer section having spaced side rails, a first hook pivoted on one rail near one end thereof and extending beyond the end of said rail for engaging a coupling stud on a corresponding side rail of an adjoining section, a coupling stud on said one rail near the opposite end thereof for engaging a hook pivoted on a corresponding side rail of another adjoining section, a second hook pivoted on the other side rail near the opposite end thereof for engaging a coupling stud on a corresponding side rail of the other section, a second coupling stud on said other rail near said one end for engaging a hook pivoted on a corresponding rail of the adjoining section, and cooperating abutments between said hooks and said side rails limiting pivotal movement of said hooks relative to said side rails to maintain alignment of adjoining sections.

9. In a conveyer section having spaced side rails, a universal coupling comprising a rod extending between said side rails at one end of said section, a hook pivoted on one side rail near said one end and extending beyond said end for engaging the rod at the end of an adjoining section, abutments on said hook engaging the rod at said one end of said section and limiting pivotal movement of said hook relative to said one rail, said rod projecting from the other rail of said section for engaging a hook on a corresponding rail of the adjoining section.

10. In a conveyer section having spaced side rails, a universal coupling comprising a hook pivoted to one of said rails near one end thereof, an abutment stud on said one rail, abutments on said hook engaging said abutment stud for limiting pivotal movement of said hook relative to said one rail, and a coupling stud projecting from the other of said rails transversely alined with said abutment stud, said coupling stud being arranged to engage the hook on a corresponding side rail of an adjoining section.

11. In a conveyer section having spaced side rails, a universal section coupling comprising rods extending between the rails at both ends of the conveyer section, a first coupling member pivoted to one side rail near one end thereof, upwardly and downwardly extending hooks on said coupling member beyond said one end of the side rail, abutment means on said coupling member engaging the rod at said one end of the section for limiting pivotal movement of said coupling member relative to said one side rail, said rod at said one end projecting from the other side rail for engagement with a hook on a coupling member pivoted on a corresponding rail of an adjoining section, a second coupling member pivoted to said other side rail near the opposite end of said section, upwardly and downwardly extending hooks on said second coupling member beyond said opposite end of the section, and abutment means on said second coupling member engaging the other of said rods for limiting pivotal movement of said second coupling member relative to said other side rail, said other rod projecting from said one rail for engagement with a hook on a coupling member pivoted on a corresponding side rail of an adjoining section.

12. In a conveyer section having spaced side rails, a first coupling member pivoted to one side rail near one end of said section, upwardly and downwardly extending hooks on said coupling member beyond said one end of the section for engaging a coupling stud on a corresponding side rail of an adjoining section, an abutment stud projecting from said one side rail, abutment means on said coupling member engaging said abutment stud for limiting pivotal movement of said coupling member relative to said one side rail, a coupling stud projecting from the other side rail of said section and alined with said abutment stud, said coupling stud being arranged to engage a hook pivoted to a corresponding side rail on an adjoining section, a second coupling member pivoted to said other side rail near the opposite end of said section, upwardly and downwardly extending hooks on said second coupling member beyond said opposite end of the section, a second abutment stud projecting from said other side rail, abutment means on said second coupling member engaging said second abutment stud for limiting pivotal movement of said second coupling member relative to said other side rail, and a second coupling stud projecting from said one side rail alined with said second abutment stud, said second coupling stud being arranged to engage a hook pivoted to a corresponding side rail of an adjoining section.

MARTIN J. ANDERSON.

References Cited in the file of this patent

UNITED STATES PATENTS

| Number | Name | Date |
|---|---|---|
| 872,856 | Spence | Dec. 3, 1907 |
| 949,405 | Smith | Feb. 15, 1910 |
| 1,004,976 | Bodman | Oct. 3, 1911 |
| 1,226,182 | Buck | May 15, 1917 |
| 2,349,884 | Rietz | May 30, 1944 |
| 2,470,275 | Warshaw | May 17, 1949 |